United States Patent
Wojsznis et al.

(10) Patent No.: US 11,467,545 B2
(45) Date of Patent: Oct. 11, 2022

(54) DUAL-MODE MODEL-BASED CONTROL OF A PROCESS

(71) Applicant: FISHER-ROSEMOUNT SYSTEMS, INC., Round Rock, TX (US)

(72) Inventors: Wilhelm K. Wojsznis, Oborniki (PL); Mark J. Nixon, Round Rock, TX (US); John M. Caldwell, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 236 days.

(21) Appl. No.: 16/804,799

(22) Filed: Feb. 28, 2020

(65) Prior Publication Data

US 2021/0271212 A1 Sep. 2, 2021

(51) Int. Cl.
*G05B 13/04* (2006.01)

(52) U.S. Cl.
CPC ......... *G05B 13/041* (2013.01); *G05B 13/048* (2013.01)

(58) Field of Classification Search
CPC ............... G05B 13/041; G05B 13/048; G05B 19/41845; G05B 2219/33273; G05B 13/04; G05B 19/41885
See application file for complete search history.

(56) References Cited

U.S. PATENT DOCUMENTS

| | | | |
|---|---|---|---|
| 2004/0117766 A1* | 6/2004 | Mehta | G05B 13/048 717/121 |
| 2007/0168057 A1* | 7/2007 | Blevins | G05B 13/022 700/53 |
| 2015/0143885 A1 | 5/2015 | Konig et al. | |
| 2018/0363580 A1* | 12/2018 | Jin | F02D 41/0007 |

OTHER PUBLICATIONS

Search Report for Application No. GB2102587.9, dated Oct. 27, 2021.

* cited by examiner

*Primary Examiner* — Kenneth M Lo
*Assistant Examiner* — Mohammed Shafayet
(74) *Attorney, Agent, or Firm* — Marshall, Gerstein & Borun LLP

(57) ABSTRACT

The disclosed systems and techniques enable dual mode operation for model-based controllers in which the controllers are capable of operating in both (i) a constrained solution mode, and (ii) an unconstrained solution mode. The dual mode operation improves control because it enables the use of constrained solution mode operation when possible (constrained solution mode often enables superior control) and enables the use of unconstrained solution mode when constrained solution mode is not possible (e.g., when it is impossible to develop the constrained solution with the time available). This enables superior control when compared to typical model predictive control (MPC) controllers.

18 Claims, 6 Drawing Sheets

DUAL-MODE MODEL-BASED CONTROL OF A PROCESS

TECHNICAL FIELD

The present disclosure generally relates to utilizing model-based predictive control and, more specifically, to utilizing a dual-mode of operation that simultaneously generates constrained and unconstrained solutions to an optimization problem.

BACKGROUND

Distributed process control systems, such as distributed or scalable process control systems like those used in power generation, chemical, petroleum, or other processes, typically include one or more process controllers communicatively coupled to each other, to at least one host or operator workstation via a process control network, and to one or more instrumentation or field devices via analog, digital, or combined analog/digital buses.

The field devices perform functions within the process or plant such as opening or closing valves, switching devices on and off, and measuring process parameters. Example field devices include valves, valve positioners, switches, and transmitters (e.g., devices including sensors for measuring temperature, pressure, or flow rate; and transmitters for transmitting the sensed temperatures, pressures, and flow rates).

The process controllers, which are typically located within the plant environment, receive signals indicative of process measurements made by the field devices (or other information pertaining to the field devices) and execute a controller application that runs, for example, different control modules which make process control decisions, generate control signals based on the received information, and coordinate with the control modules or blocks being implemented in smart field devices (e.g., HART®, WirelessHART®, and FOUNDATION® Fieldbus field devices).

Execution of the control modules causes the process controllers to send the control signals over the communication links or signal paths to the field devices, to thereby control the operation of at least a portion of the process plant or system (e.g., to control at least a portion of one or more industrial processes running or executing within the plant or system). For example, a first set of controller(s) and field devices may control a first portion of a process being controlled by the process plant or system, and a second set of controller(s) and field devices may control a second portion of the process.

The network formed by one or more controllers, the field devices communicatively connected to the one or more controllers, and the intermediary nodes facilitating communication between the controllers and field devices may be referred to as an "I/O network" or "I/O subsystem."

Information from the I/O network(s) may be made available over a data highway or communication network (the "process control network") to one or more other hardware devices, such as operator workstations, personal computers or computing devices, handheld devices, data historians, report generators, centralized databases, or other centralized administrative computing devices that are typically placed in control rooms or other locations away from the harsher field environment of the plant, e.g., in a back-end environment of the process plant.

The information communicated over the process control network enables an operator or a maintenance person to perform desired functions with respect to the process via one or more hardware devices connected to the network. These hardware devices may run applications that enable an operator to, e.g., change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

As an example, the DeltaV™ control system and Ovation™ distributed control system (DCS) sold by Emerson each includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object-oriented programming protocol that (i) perform functions within the control scheme based on inputs thereto and (ii) provide outputs to other function blocks within the control scheme. The configuration application may also allow a configuration designer to create or change operator interfaces which are used by a viewing application to display data to an operator and to enable the operator to change settings, such as set points, within the process control routines.

Each dedicated controller (and, in some cases, one or more field devices) stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In addition to process controllers, I/O cards, and field devices, a typical process control system includes many other supporting devices which are also necessary for, or related to, process operation. These additional devices include, for example, power supply equipment, power generation and distribution equipment, rotating equipment such as turbines, etc., which are located at numerous places in a typical plant.

Regarding process controllers, controllers generally can be divided into two categories: traditional controllers (such as PID controllers) and model-based controllers (such as MPC controllers). Each of these types of controllers can control a process, which may be characterized as having one or more process outputs (e.g., a flow, pressure, temperature, composition, humidity, opacity, density measurement, etc.) and one or more process inputs (e.g., valve positions, flow rates, etc.). Model-based controllers have an advantage over traditional controllers such as PID controllers because model-based controllers can implement more effective control than traditional controllers when controlling a complex process. This can be attributed, at least in part, to a model-based controller's ability to predict future states of the process being controlled.

Traditional controllers typically manipulate a process input (which may be referred to as a "manipulated variable") to change a process output (which may be referred to as a "controlled variable" or simply a "process variable") based on feedback (i.e., a measurement of the controlled variable) and a desired value for the process output (i.e., a setpoint).

By comparison, model-based controllers (e.g., model predictive controllers or MPCs), such as those described herein, have an advantage over traditional controllers such as PID controllers in that a model-based controller can predict future states of the process based on a process model representing the dynamic relationships between the process inputs and process outputs of the process being controlled. That is, a model-based controller can implement control based not only on feedback and desired values for process outputs, but based also on predicted future values of process outputs that the controller predicts or anticipates based on the process model and measurements of process outputs. Accordingly, a model-based controller can account for potential future events in a manner that is not possible with traditional controllers, and can be especially effective for controlling complex processes that have significant multivariable interaction (e.g., where a change in a single manipulated variable or process output influences the value(s) of multiple other process outputs).

While model-based controllers provide a number of desirable performance characteristics, the process control industry has been slow to fully adopt model-based control techniques. This limited adoption can be attributed, at least in part, to the fact that model-based controllers typically need an accurate process model to implement effective control of the process. Unfortunately, process characteristics often change over time. If a model-based controller continues using an old process model for a process that has changed, the model-based controller's performance can fall off rapidly due to process model mismatch (i.e., the characteristics of the process model do not match the characteristics of the process being modeled). To avoid this performance drop off, process model mismatch generally needs to be corrected.

Typically, a model-based controller corrects for process model mismatch by generating a new process model during a model identification or generation procedure so that the new process model matches the current characteristics of the process. Unfortunately, model generation can be problematic because model generation often involves interrupting normal control of the process. As noted above, a process model used by a model-based controller generally represents the dynamic relationships between the inputs and outputs of the process being controlled. Traditionally, these dynamic relationships are captured during a model generation procedure that involves (i) introducing known disturbances or upsets into the process by changing one or more manipulated variables, and (ii) observing how the process reacts to the changes to the manipulated variables. When the process finishes responding to the changes to the manipulated variables and reaches a steady state, the controller can generate a process model based on the relationship between the changes to the manipulated variables and the observed process response. The controller may then resume normal control utilizing the new (and likely more accurate) process model.

Unfortunately, model generation often involves interrupting normal control of the process to introduce the previously described known disturbances, which can be problematic. In particular, interruption of normal control typically negatively affects operation of the process and may result in wasted material or time. In some cases, model generation can be quite time intensive, amplifying this negative effect. For example, model generation can take a very long time for certain slow processes where a process variable may take minutes, hours, and even days to reach a set point or final resting value. Moreover, a model-based controller may require frequent model regeneration because the characteristics of a process often change over time due to failing or degrading equipment, atmospheric changes, changes in raw materials, etc. In short, the process control industry has been slow to fully adopt model-based control because the model generation process (which traditionally includes interrupting normal operation, introducing disturbances, observing the process response until the process reaches steady state, and generating a model based on the observances) can take a long time and can consequently interfere with normal operation goals.

In any event, even putting aside issues with process model mismatch, model-based controllers have seen limited adoption because developing precise and accurate predictions within a limited time frame can be difficult. Generally speaking, process controllers are configured to transmit controller outputs to field devices at fairly regular intervals (e.g., every few seconds to every few minutes). Ideally a model-based controller develops accurate predictions through a number of intervals into the future. But due to the fact that developing these accurate and precise predictions within the given time interval can be challenging (particularly for complex processes including multiple interacting inputs and outputs), the advantages that might otherwise be gained from implementing model-based control are lessened or negated. As a result, process plants often rely on traditional control techniques rather than model-based control techniques.

Note, this background description provides context to facilitate understanding and appreciating the detailed description below. Work of the presently named inventors, to the extent described in this background section (as well as aspects of the background description that may not otherwise qualify as prior art at the time of filing) are neither expressly nor impliedly admitted as prior art against the present disclosure.

SUMMARY

The disclosed systems and techniques enable dual mode operation for model-based controllers in which the controllers are capable of operating in both (i) a constrained solution mode, and (ii) an unconstrained solution mode. The dual mode operation improves control because it enables the use of constrained solution mode operation when possible (constrained solution mode often enables superior control) and enables the use of unconstrained solution mode when constrained solution mode is not possible (e.g., when it is impossible to develop the constrained solution with the time available). This enables superior control when compared to typical model predictive control (MPC) controllers.

In an embodiment, comprises any one or more of: (A) implementing model-based control, via a process controller coupled to one or more field devices, of a process represented by a set of process variables (PVs) including (i) a set of manipulated variables (MVs) adjustable by the process controller via the one or more field devices, and (ii) a set of controlled variables (CVs), each of which is dependent on one or more MVs in the set of MVs; (B) initiating a scan, at a beginning of a scan period, by a process controller to obtain a current set of measured values of the CVs; (C) prior to the scan period ending, implementing a dual-mode of operation that includes selecting a current move plan to be implemented by the process controller for the set of MVs in accordance with a process model and a set of constraints for the PVs; and (D) implementing control of the process before the end of the scan period by setting the set of MVs to a set of values included in the current move plan by: transmitting a set of controller outputs, carrying the set of values, to the field devices to cause the field devices to drive the set of MVs to the set of values. Implementing the dual-mode of operation may include: (i) initiating generation, using the current set of measured values of the set of CVs as model inputs for the process model, of both: (a) an unconstrained solution including a series of unbounded move plans that are unbound by the set of constraints, and (b) a constrained solution including a series of bounded move plans that avoid violating any of the set of constraints. Implementing the dual-mode of operation may further include: (ii) when the constrained solution is generated before the end of the scan period: selecting, as the current move plan, a first move plan from the series of bounded move plans of the constrained solution; and (iii) when the constrained solution is not generated before the end of the scan period: selecting, as the current move plan, a first move plan from the series of unbounded move plans of the unconstrained solution.

In an embodiment, a method comprises any one or more of: (A) implementing a dual-mode model-based process controller configured to control one or more field devices in a process control environment; (B) initiating a scan by the model-based controller to obtain a set of current values for a set of process variables (PVs), the set of current values representing a current state of the controlled process, the process variables including a plurality of controlled variables (CVs) and a plurality of manipulated variables (MVs); (C) generating an unconstrained solution to an optimization problem utilizing a process model by generating, using the process model, a series of move plans for the plurality of MVs to achieve a predetermined objective regardless of whether or not any of the series of move plans violate any of a set of constraints for the PVs, such that the value for each MV in each of the series of move plans is unbound by the set of constraints; and (D) initiating generation of a constrained solution to the optimization problem utilizing the process model.

Initiating generation of the constrained solution may include any one or more of: (i) storing the unconstrained solution as a candidate solution; (ii) bounding a first MV, from the plurality of MVs, by analyzing the candidate solution to: (a) identify a first-in-time violation of a constraint and determine that the first MV resulted in the first-in-time violation; and (b) calculate an allowable range for the first MV based on one or more values for the first MV included in move plans scheduled prior to the first-in-time violation. Generating the constrained solution may further include: (iii) bounding the remaining MVs, from the plurality of MVs, by generating, in an iterative manner, a modified candidate solution including a modified series of move plans for each remaining MV such that each modified candidate solution maintains previously bounded MVs within calculated allowable ranges and such that each successive modified candidate solution includes one less unbound MV than the previous modified candidate solution, wherein the remaining MVs are bounded in an order based on which of the remaining MVs is first to violate a constraint for each modified candidate solution; and/or (iv) after each of the plurality of MVs has been bound such that the last modified candidate solution includes a final series of move plans that does not violate any of the set of constraints, finalizing the constrained solution by storing the last modified candidate solution as the constrained solution. The method may further include any one or more of: (E) when the scan period expires before the constrained solution is finalized: (i) modifying any values, in a first move plan for the unconstrained solution, that violate any of the set of constraints to achieve a bounded first move plan that does not violate any of the set of constraints, and (ii) utilizing the bounded first move plan of the unconstrained solution for a set of controller outputs to control the one or more field devices in accordance with the bounded first move plan; and (F) when the constrained solution is finalized before the scan period expires, utilizing a first move plan of the constrained solution for the set of controller outputs to control the one or more field devices in accordance with the bounded first move plan.

Note, this summary has been provided to introduce a selection of concepts further described below in the detailed description. As explained in the detailed description, certain embodiments may include features and advantages not described in this summary, and certain embodiments may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

DETAILED DESCRIPTION

The disclosed systems and techniques enable dual mode operation for model-based controllers in which the controllers are capable of operating in both (i) a constrained solution mode, and (ii) an unconstrained solution mode. The dual mode operation improves control because it enables the use of constrained solution mode operation when possible (constrained solution mode often enables superior control) and enables the use of unconstrained solution mode when constrained solution mode is not possible (e.g., when it is impossible to develop the constrained solution with the time available). This enables superior control when compared to typical model predictive control (MPC) controllers.

I. An Example Process Control Environment

Figure 1:
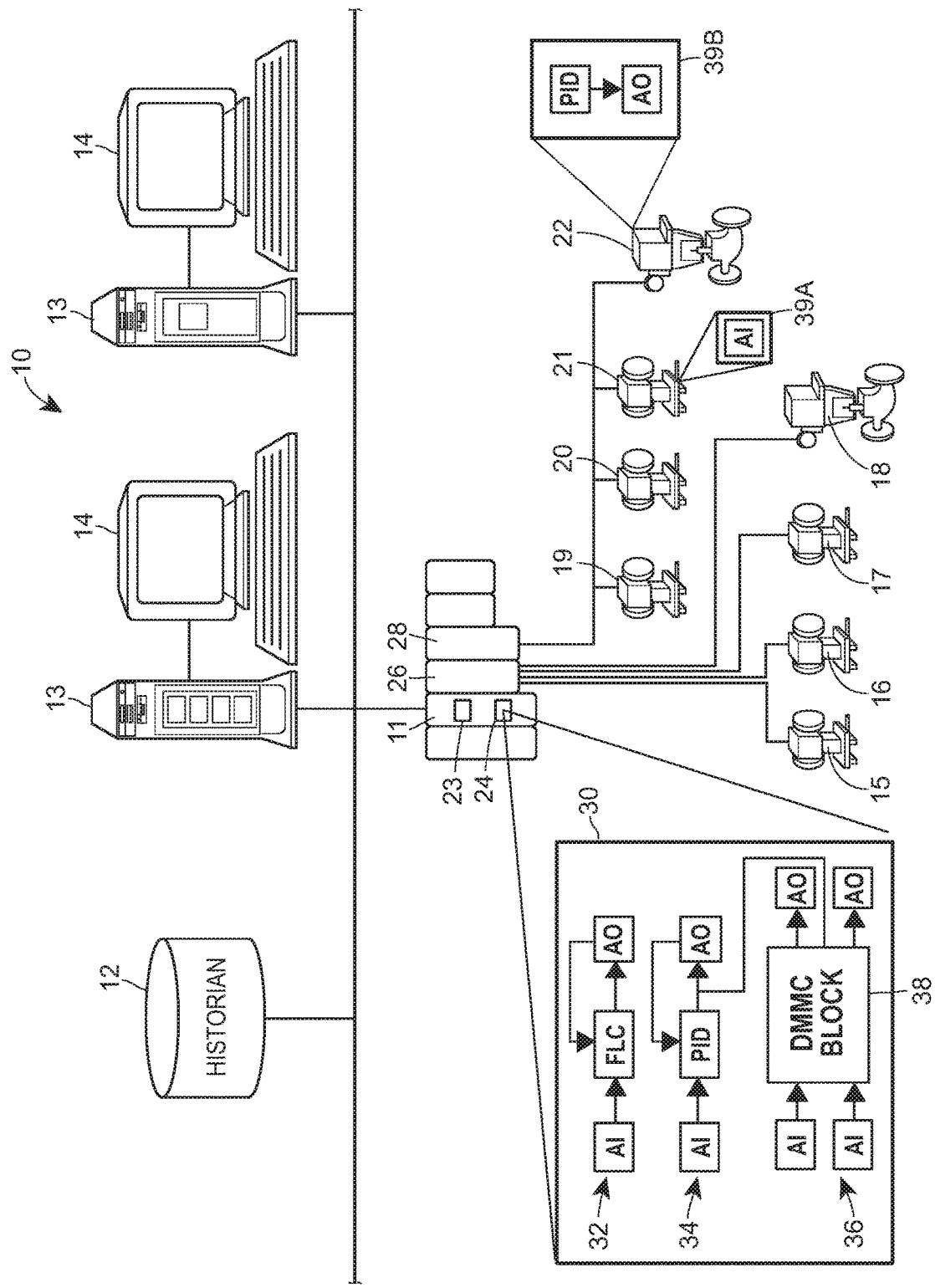
FIG. 1 is a block diagram of a process control system, including a controller with a dual-mode model-based control (DMMC) block that may be implemented to control a process.

A process control system 10, such as that illustrated in FIG. 1 may be used to implement the dual model model-based control methodology described herein to control a process. The controlled process may any suitable process, and may be said to have one or more "process outputs" characterizing the state of the process (e.g., tank levels, flow rates, material temperatures, etc.) and one or more "process inputs" (e.g., the state of various environmental conditions and actuators, the manipulation of which may cause process outputs to change).

In this example, the process control system 10 includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data. The controller 11 is, in FIG. 1, communicatively connected to the field devices 15-22 using a hardwired communication network and communication scheme.

Generally, the field devices 15-22 may be any types of devices, such as sensors, valves, transmitters, positioners, etc., while the I/O cards 26 and 28 may be any types of I/O devices conforming to any desired communication or controller protocol. The controller 11 includes a processor 23 that implements or oversees one or more process control routines (or any module, block, or sub-routine thereof) stored in a memory 24. Generally speaking, the controller 11 communicates with the devices 15-22, the host computers 13 and the data historian 12 to control a process in any desired manner. Moreover, the controller 11 implements a control strategy or scheme using what are commonly referred to as function blocks, wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs a PID, an MPC, a fuzzy logic, etc., control technique, or an output function which controls the operation of some device, such as a valve, to perform some physical function within the process control system 10. Of course, hybrid and other types of function blocks exist and may be utilized herein. The function blocks may be stored in and executed by the controller 11 or other devices as described below.

A. Example Single Loop Control Loops 32 and 34

As illustrated by the exploded block 30 of FIG. 1, the controller 11 may include a number of single-loop control routines, illustrated as control routines 32 and 34, and, if desired, may implement one or more advanced control loops, illustrated as a control loop 36. Each such control loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10.

B. An Example Advanced Control Loop 36 and Dual-Mode Model Control

The advanced control loop 36 is illustrated as including a dual-mode model-based control (DMMC) block or routine 38 having inputs communicatively connected to one or more AI function blocks and outputs communicatively connected to one or more AO function blocks, although the inputs and outputs of the DMMC block 38 may be connected to any other desired function blocks or control elements to receive other types of inputs and to provide other types of control outputs (e.g., DI blocks, DO blocks, etc.).

The DMMC block 38 may implement the dual mode model-based control techniques described herein. More generally, the DMMC block 38 may implement any type of multiple-input, multiple-output control scheme, and/or may implement a process model based control routine, and thus may constitute or include a model predictive control (MPC) block, a neural network modeling or control block, a multivariable fuzzy logic control block, a real-time-optimizer block, etc.

It will be understood that the function blocks illustrated in FIG. 1, including the DMMC block 38, can be executed by the stand-alone controller 11 or, alternatively, can be located in and executed by any other processing device or control element of the process control system 10, such as one of the workstations 13 or one of the field devices 19-22. As an example, the field devices 21 and 22, which may be a transmitter and a valve, respectively, may execute control elements for implementing a control routine and, as such, include processing and other components for executing parts of the control routine, such as one or more function blocks. More specifically, the field device 21 may have a memory 39A for storing logic and data associated with an analog input block, while the field device 22 may include an actuator having a memory 39B for storing logic and data associated with a PID, an MPC or other control block in communication with an analog output (AO) block, as illustrated in FIG. 1.

As noted, the controller 11 may implement the DMMC block 38 to implement dual mode model-based control. The process controlled by the dual-mode controller 11 (sometimes simply referred to as "controller 11") may be characterized by a set of process variables or PVs. The PVs may include: (i) manipulated variables or MVs that are manipulated by the controller 11 (e.g., valve positions) via controller outputs; (ii) controlled variables or CVs that are indirectly controlled by way of adjusting the MVs (e.g., a water tank temperature that is controlled by adjusting a valve position for a cold water inlet valve); (iii) auxiliary variables or AVs that may be indirectly impacted by changes in CVs or MVs (e.g., a water tank level); and (iv) disturbance variables or DVs (e.g., an ambient temperature of the room may slightly impact the water tank temperature). Generally speaking, when implementing model-based control (in either constrained or unconstrained solution mode), the controller 11 uses all CV measurements to calculate all MVs simultaneously.

In an embodiment, the controller 11 operates according to a scan period k (e.g., 1 minute). At every instant k (e.g., every minute), the controller 11 receives controller inputs carrying measured PVs (e.g., CVs and/or AVs). Based on the current measured values, the controller relies on a process model to predict future values of PVs and to develop a "move plan" for the MVs to help drive the CVs and/or AVs to desired values. At the end of the scan period, the controller 11 transmits the MV values in the move plan to field devices (e.g., valve actuators) via control signals or controller outputs. Then, the controller 11 again receives the measured PVs and repeats the process.

As described herein, a "move plan" refers to a set of values for a set of MVs, controlled by the controller 11, to be implemented at the end of each scan period. Whether in constrained or unconstrained solution mode, the controller 11 may calculate during each scan period a series of move plans extending into the future. Generally speaking, a "bounded move plan" includes a set of MVs that do not result in any immediate constraint violations (i.e., the MV values do not violate any MV constraints, and the predicted response of corresponding CVs or AVs will not immediately violate a constraint). An "unbounded move plan" on the other hand, has been generated without concern for constraints, and thus may include MV values that violate MV constraints or that result in constraint violations (e.g., of CVs or AVs). Note, the future move plans after the first move plan are typically not implemented because the controller 11 typically recalculates the series of move plans at every scan as part of a calculation of an optimal solution.

"Optimization" occurs by developing a "solution" to an "objective function." Generally speaking, the "objective function" is a formula that may be solved to determine any useful metric (e.g., often profit). An example objective function might be the formula "profit=24x+20y," where x is a first type of widget and y is a second type of widget. The optimal solution may be found by minimizing or maximizing the objective function, depending on the nature of the objective function (in the previous example, the goal would be maximizing profit). Identifying an optimal solution involve evaluating numerous candidate solutions.

As described herein, a "solution" to an optimization problem or objective function refers a solution developed by an optimizer algorithm or routine, which may be implemented by the controller 11 or computing device in communication with the controller 11. A "solution" may be characterized as a set of target values for a set of PVs at a steady state operating point of the process at the end of a control or prediction horizon of the controller 11, as well as a set of values for the PVs (e.g., for the MVs, CVs, and AVs) at every controller scan or controller interval between the current state of the process and the end of the horizon. The "prediction horizon" represents the number of scans into the future that are evaluated by the optimizer, while the "control horizon" represents the number of scans into the future for which MV values are predicted to be output; that is, the control horizon represents the number of assumed "move plans" for the MVs to be evaluated.

As an example, if the prediction horizon is 10 and the control horizon is 5, the solution may include 10 sets of target values for the PVs (including 5 move plans to be implemented over the next 5 scans, wherein each move plan includes a set of values for the MVs). In any event, the controller 11 may develop either or both "unconstrained solutions" and "constrained solutions," sometimes simultaneously.

During unconstrained solution optimization, the controller 11 generates controller outputs (carrying MV values to field devices) based on the first move plan included in an unconstrained solution. The controller 11 may develop the unconstrained solution by feeding the following to an optimizer: (i) a pre-generated process model (typically generated off-line) that was generated to model the process at the time of generation; (ii) current process variable values; and (iii) one or more control objectives. The optimizer identifies a solution to the objective function to reach steady state values for the process variables, as well as target values for the process variables at each of a number of "moves" to be implemented by the controller 11. The controller 11 then identifies the first "move plan" from the solution (which includes a set of desired values for manipulated variables) and "bounds" a set of desired values in the first move plan if any of the values violates a constraint or would result in a violation of a constraint (e.g., of a CV or AV). The controller 11 may then transmit controller output signals carrying the "bounded" values of the first move plan to field devices to implement control of the process.

By comparison, constrained solution optimization can offer superior control when the conditions are appropriate. During constrained solution optimization, the controller 11 generates controller outputs by (i) developing a process model in real-time when possible, and (ii) feeding the optimizer the following: (a) the current process model with current process variable values; (b) control objectives; and (c) the constraints of all process variables (e.g., all CVs, AVs, MVs, and DVs). The optimizer develops a constrained solution (e.g., including target CVs, AVs, and MVs for each scan period) by first calculating the unconstrained solution. Then, the optimizer identifies the first MV to become constrained in time within the series of move plans (i.e., find the earliest MV constraint violation). The allowable portion of the move plan for this MV is then imposed on the problem. Next, the controller 11 recalculates the unconstrained solution using the remaining MVs, and the process is repeated until either all MVs are constrained or the unconstrained solution does not violate any constraints. Using this iterative procedure, a set of controller outputs that will not result in constraint violations is identified. This process is computationally intensive, particularly compared to unconstrained solution mode, during which the controller 11 calculates relatively simple solutions requiring relatively short on-line execution time.

Constrained solution optimization has at least two advantageous features. First, the control matrix or model may be generated on-line at each control cycle. All dependent variables (e.g., CVs and AVs) are included in the dynamic matrix in the move calculation. The Penalty on Error (PE) for each dependent variable is adjusted at each control cycle. If a CV is far from the limits, its PE can be set to zero to effectively remove it from the dynamic control problem. Conversely, if a CV is near a limit, the full value of the PE may be used. By this means, the dynamic move calculation at each control cycle may include only those CVs that are near their limits, and may exclude those that are far from their limits.

A second advantage is the enforcement of MV constraints on the future move plan. This prevents the controller 11 from planning moves that cannot be implemented. As noted, the general approach is to first calculate the unconstrained MV solution. The second step is to find the first MV to become constrained in time (find the earliest MV constraint violation). The allowable portion of the move plan for this MV is then imposed on the problem. Next, the unconstrained solution using the remaining MVs is calculated and the process is repeated until either all MVs are constrained or the unconstrained solution does not violate any constraints.

The dual mode controller 11 may operate in two modes simultaneously. First, a constrained solution may be obtained with a complete series of move plans through the end of the prediction or control horizon, wherein all relevant PVs are constrained throughout the entire series of move plans. The MV values in the first move plan in the constrained solution may be utilized for the controller outputs. Second, an unconstrained solution may be obtained, and the controller 11 may modify MV values in the first move plan as necessary to avoid violating constraints.

Generally speaking, an "output selector" of the controller 11 may select, at the end of the control scan, a first MV move plan from either the constrained or unconstrained solution. The first preference is generally the constrained solution. But if the constrained solutions has not finished or finalized by the end of the controller scan, the controller 11 uses the first move plan of the unconstrained solution, and adjusts the unconstrained first move plan as necessary to avoid violating any constraints.

Note, while the techniques described herein are referred to as a "dual mode," it will be appreciated that the controller 11 may be thought of as implementing "triple mode" control. That is, the controller 11 may develop may determine controller output MV values from three distinct first move plans. First, at the end of the controller scan, the controller 11 may select MV values from the first move plan of the constrained solution if available. Second, if the constrained solution is not ready yet, the controller 11 may selects a first move plan from the unconstrained solution. Third, if the unconstrained solution is also unavailable, the controller 11 may selects MV values for the controller outputs calculated from a pre-generated controller matrix.

II. An Example PID Control Loop

Figure 2:
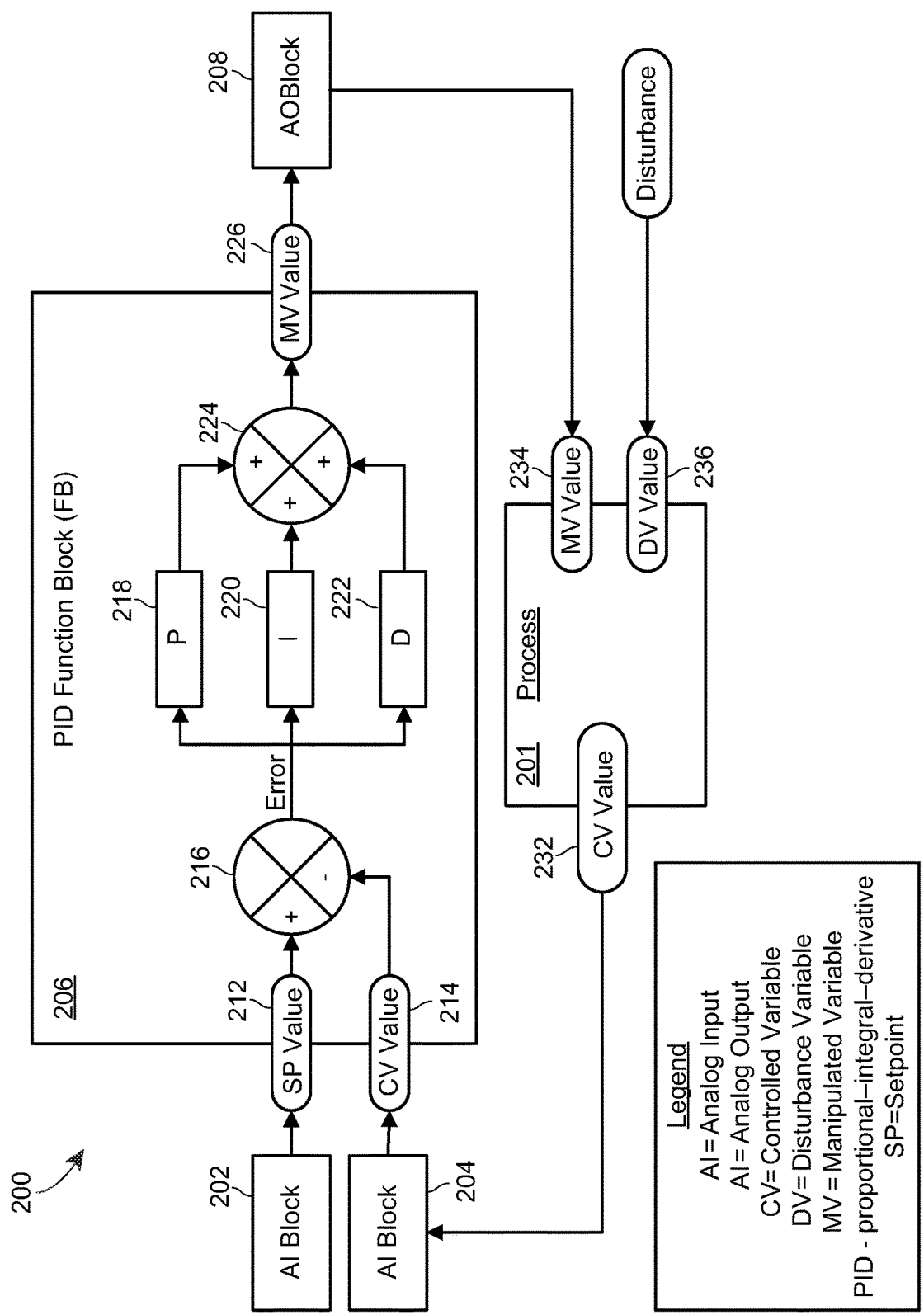
FIG. 2 shows an example PID control routine that does not enable predictive control or any of the corresponding benefits associated with the dual-mode model control provided by the DMMC block shown in FIG. 1.

FIG. 2 shows an example PID control routine 200 that does not enable predictive control or any of the corresponding benefits associated with the dual-mode model control provided by the DMMC block 38 when implemented by the controller 11.

As used herein, "predictive control" refers to a technique of process control in which the values for one or more MVs output by a controller (e.g., via control signals transmitted to field devices) account for future values predicted for one or more PVs (e.g., one or more CVs responsive to the MVs). As noted, the routine 200 does not enable predictive control.

The control loop 200 may be similar to the control loops 32 and 34 shown in FIG. 1. Notably, the control routine/loop 200 does not rely on predictive control or model-based control. Because the DMMC block 38 relies on predictive control, it can offer more precise and improved performance relative to the control routine 200.

At a high level, the control routine 200 controls a process 201 by attempting to drive a controlled variable (CV) (e.g., a water tank level) to a particular set point. The control routine 200 receives a set-point (SP) or desired value 212 for the CV, measures an actual value 214 of the CV, calculates the error or difference 216 between the SP and measured CV value, and then calculates a command or controller output (e.g., a manipulated variable (MV) 226) to which the CV is responsive (e.g., an inlet valve position to the tank) (e.g., based on a sum 224 of a proportional factor 218, an integral factor 220, a derivative factor 222, or some combination thereof). The controller may transmit the value 226 (e.g., an actuator position), via the AO block 208, to the appropriate MV (e.g., an actuator) to drive a CV 232 (e.g., a temperature, level, or flow rate) to the SP value 212. As shown, the CV 232 in the process 201 may be influenced by one or more parameters outside the direct control of the loop 200. These parameters may be referred to as disturbance variables (DVs) 236.

As shown, the control routine 200 includes four blocks: an analog input (AI) block 202, an AI block 204, a control block 206, and an AO block 208. Depending on the implementation, the AI blocks 202 and 204 may represent analog signals received (e.g., from a field device) via an I/O channel by a controller implementing the routine 200 or an I/O card coupled to the controller. For example, the AI block 204 may be bound to a first device signal tag (DST) identifying a particular AI I/O channel at a first I/O card, and the value provided by the AI block 204 may consequently be driven by the value of the signal on the particular AI I/O channel (e.g., a 4-20 ma signal provided by a flow transmitter field device representing a measured flow) Similarly, the AO block 208 may represent an analog signal to be transmitted (e.g., to a field device) via an I/O channel by a controller implementing the routine 200 or to an I/O card coupled to the controller. To illustrate, the AO block 208 may be bound to a second DST identifying a particular AO I/O channel at a second IO card. Thus, the value fed to the AO block 208 may cause the second I/O card to drive a signal on the particular AO I/O channel based on the value received at the AO block 208 (e.g., the value may cause the second I/O card to drive a 4-20 ma signal via the AO I/O channel to a valve field device to control the valve's position).

The DMMC block 38 shown in FIG. 1 may be similarly receive inputs from one or more input blocks (e.g., AI or DI blocks), which may provide the DMMC block 38 with values carried by signals received by the controller 11 via I/O channels that are bound to said blocks and that couple the controller 11 to field devices. In some instances, an input block may be a "manual" block that enables a user to enter a value which can be provided to the DMMC block 38 and controller 11 as an input (e.g., a SP for a particular CV).

Further, the DMMC block 38 and controller 11 may provide output values to one or more output blocks (e.g., AO or DO blocks), which may cause the controller 11 to transmit, to field devices, output signals carrying the output values via I/O channels bound to the blocks.

III. An Example Model Control Graph and Control Loop

Figure 3:
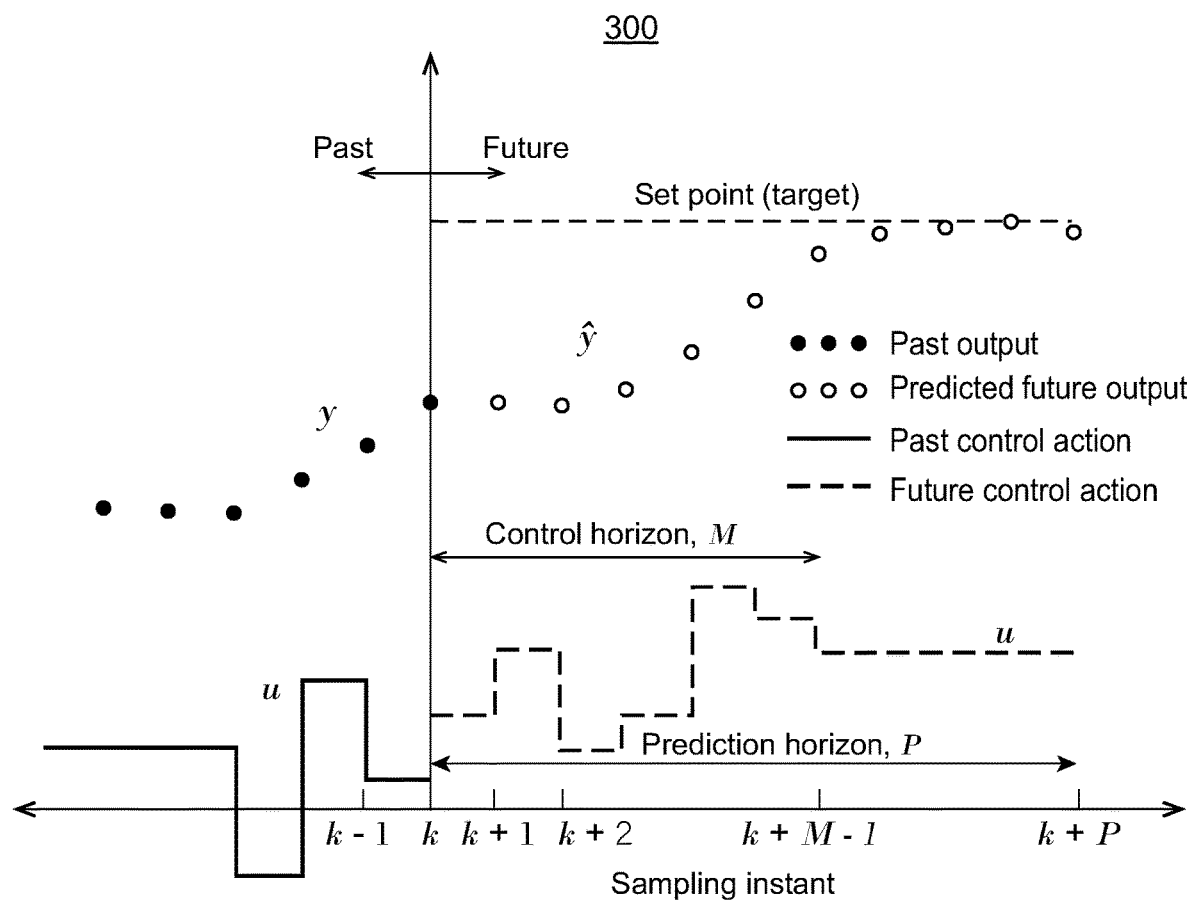
FIG. 3 is a graph depicting example model-based control operation that may be implemented by the controller shown in FIG. 1, which offers a number of benefits over the traditional feedback control techniques such as those associated with the control loop shown in FIG. 2.
Figure 4:
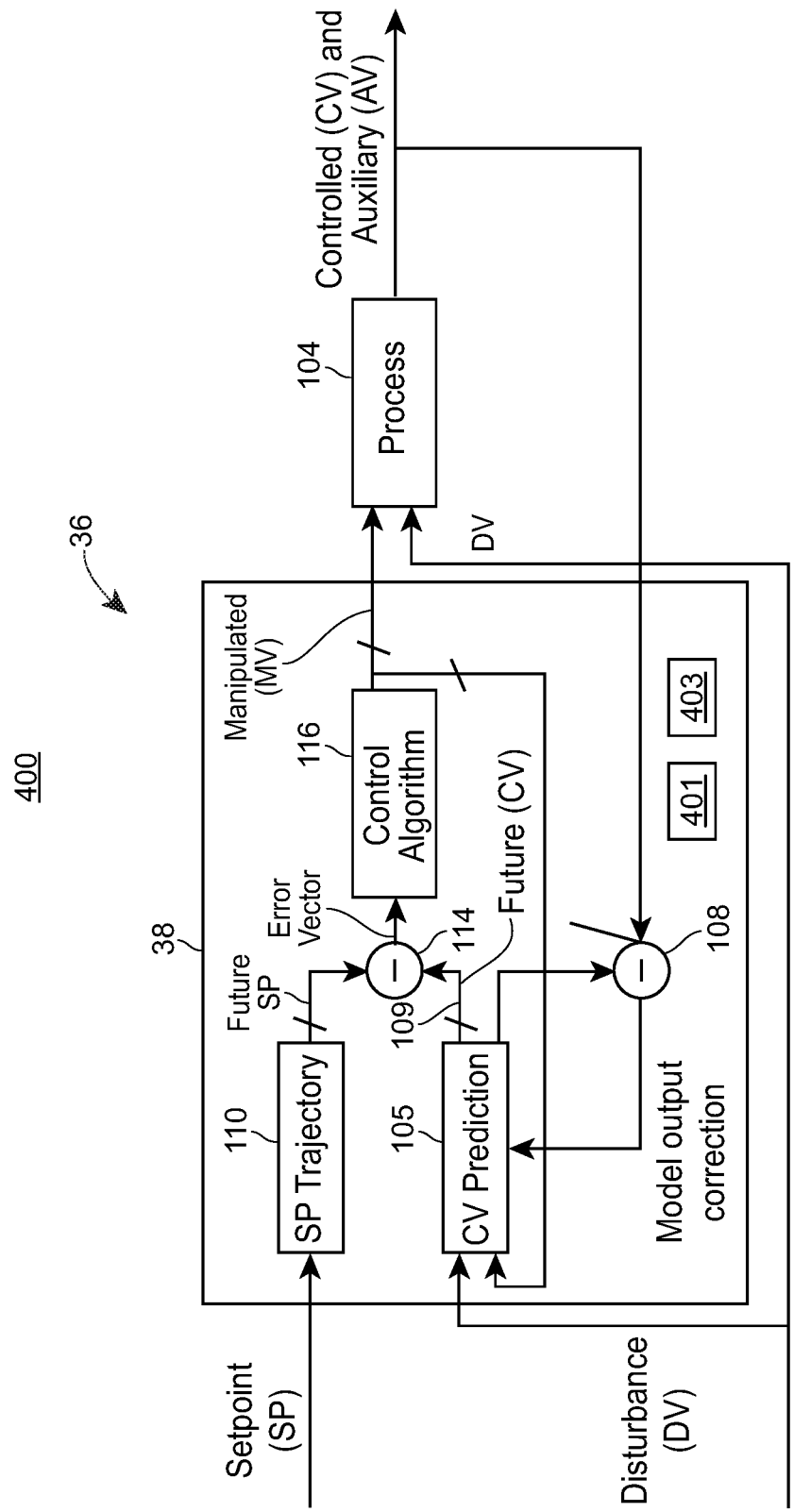
FIG. 4 is an example schematic of the dual-mode model-based control loop also shown in FIG. 1.

FIG. 3 is a graph 300 depicting example model-based control operation that may be implemented by the controller 11, which offers a number of benefits over the traditional feedback control techniques such as those associated with the control loop 200 shown in FIG. 2. FIG. 4 is an example schematic 400 of the dual-mode model-based control loop 36, according to an embodiment.

A. A Graph 300 Depicting Example Model-Based Control Operation

As shown in FIG. 3, when implementing model-based controller, the controller 11 implements a controller scan at every time instance or scan time k. The time between scans may be referred to as a "scan period," "scan time," or "control interval." The scan time may be adjustable by a user, and may be any suitable value depending on the demands of the controlled process. For example, the scan time may be 0.01 second, 0.1 second, 1 second, 10 seconds, 1 minute, 10 minutes, 1 hour, 10 hours, or any suitable value in this range.

The "prediction horizon" P implemented by the DMMC block 38 represents the number of steps or scans into the future that the DMMC block 38 evaluates. The "control horizon" M implemented by the DMMC block 38 represents the number of move plans (i.e., sets of moves for the controlled MVs) to be optimized at every control interval. So if P=10 and M=2, the DMMC block 38 optimizes for 2 MV move plans based on predictions (and evaluations) regarding the response of the relevant CVs for the next 10 scans. Each of the prediction horizon and control horizon may be manually set or adjusted by a user.

In the shown example, at each scan k, the controller 11 outputs a value u for a MV and measures a value y for a CV that is influenced by the MV and for which a SP or target exists. In some instances, multiple MVs and CVs may be controlled and evaluated.

To illustrate, imagine an example in which 12 MVs exist, 10 CVs exist, a prediction horizon of 10 exists, and a control horizon of 4 exists. At each scan, the DMMC block 38 relies on an optimizer to determine a set of steady state process variables that best satisfy an objective function 403 (e.g., representing an optimal operating point), including a set of target CVs, and a set of MVs to reach those target CVs, to implement over a series of move plans (consistent with the prediction and control horizons) to reach the desired steady state values.

More specifically (and staying with the same example), the DMMC block 38 may develop four move plans to be implemented, theoretically, over the next four scans (as explained below, typically only the first move plan is implemented because the series of move plans are recalculated every scan). Each move plan includes 12 values for the MVs (e.g., u1-u12). The DMMC block 38 feeds each move plan to a process model 105 to predict how PVs (e.g., CVs and/or AVs) will respond to each move plan. The impact of the four move plans may be evaluated for the next 10 scans (because the prediction horizon is 10).

B. An Example Block Diagram 400 of the DMMC Block 36

FIG. 4 schematically illustrates an example of the advanced control loop 36, including the DMMC block 38 according to an embodiment. Depending on the embodiment, the DMMC block 38 may have additional or alternative inputs or outputs.

As shown, the DMMC block 38 is implemented as an MPC routine to simultaneously control multiple CVs of a process 104, based on measurements taken for these CV and provided back to the DMMC block 38. In an embodiment, the DMMC block 38 may be used to implement a Dynamic Matrix Control (DMC) control technique. A control routine 116 of the DMMC block 38 may interact with an optimizer 401 to identify variable targets and values, and the optimizer 401 may in turn be configured to develop an optimal (e.g., maximum or minimum) solution to an objective function 403.

As illustrated in FIG. 4, the DMMC block 38 produces a move plan including values for a set of MVs that are provided to other function blocks (not shown in FIG. 4) which, in turn, are connected to process inputs of the process 104. The DMMC block 38 may include or implement any standard model-based predictive-control routine or procedure, typically having the same number of inputs as outputs, although that requirement is not necessary. The DMMC block 38 receives, as inputs, a set of N CVs (which may have defined constraint limits and may have defined set points) and AVs (which may have defined constraint limits only). The CVs and the AVs typically constitute vectors of values, as measured within the process 104. Lines with vector values are generally indicated in the figures with a hash line there-through.

The DMMC block 38 may also receive, as inputs, a set of DVs, which are known or expected changes or disturbances provided to the process 104 at some time in the future, and a set target control and auxiliary variables (CVT) and (AVT), indicated as set points (SPs) provided from, for example, the optimizer 401. These targets may represent a part of a solution (e.g., a series of move plans) designed to reach an optimal steady state plant operating point (e.g., represented by a set of steady state process variable targets) by the end of the control or prediction horizon.

The optimizer 401 may be any suitable optimizer (e.g., a linear programming (LP) optimizer, quadratic programming optimizer, etc.) that solves an optimization problem by generating a solution to an objective function (OF) 403.

At a high level, an optimization problem is one in which an optimizer algorithm (e.g., 401) evaluates or solves an objective function (e.g., profit=24x+20y, where x=a first type of widget and y=a second type of widget) to identify an optimal solution to the objective function (e.g., the solution, or x and y values, resulting in the maximum profit). Depending on the scenario, the optimizer 401 may develop an unconstrained solution (i.e., one that does not account for the constraints) or a constrained solution (i.e., one that accounts for the constraints on one or more variables, such as limitations on the total material utilized; limitations on the total time spent on production; limitations on certain valve ranges; etc)). A solution that violates one or more variable constraints may be referred to as an "infeasible solution."

Generally speaking, the objective function 403 may specify costs or profits associated with each of a number of control, auxiliary and manipulated variables. To solve the OF 403, the optimizer 401 sets control variable target values (CVTs), auxiliary variable target values (AVTs), and manipulated variable target values (MVTs) over a series of move plans to reach steady state target values for the CVs and AVs. The final steady state target values included in a solution may be referred to as steady state control variables (CVSS) and steady state auxiliary variable (AVSS), and may represent an optimal operating point that maximizes or minimizes the objective function 403.

The series of process variable targets (e.g., the MVs, CVs, or AVs) may be referred to as a "solution" calculated by the optimizer 401. Each set of MVTs calculated for a particular scan period may be referred to as a "move plan." Said another way, a solution may include a series of move plans (e.g., a set of target values for the MVs) and corresponding CVTs and AVTs, wherein each move plan and corresponding set of CVTs/AVTs correspond to a different one of a series of control scans. At each scan time, the process may be said to have an operating point represented by the predicted or target values CVTs, AVTs, and/or MVTs.

The move plans are generated or selected under the assumption that they will be implemented across a series of scans or controller intervals (e.g., a first move plan at time k, a second move plan at time k+1, etc.). At any given time, a move plan may be thought to result in an "operating point," which can be characterized by values for the PVs (e.g., the CVs, AVs, and/or MVs) at the time in question. An operating point be a "steady state" operating point in which most of the PVs are changing little, if at all, over a given time period. An operating point may be in a "non-steady state" if one or more PVs are dramatically changing over a time period.

In any event, the solution (e.g., the MVTs, CVTs, and AVTs for each of the series of move plans) may be fed to the control algorithm 116, which may then calculate the next actual move plan to implement. While the MV values of the next actual move plan to be implemented by the routine 116 and controller 11 may be the same or similar to the received MVTs for the next move plan calculated by the optimizer 401, differences may sometimes exist. For example, if the first move plan from the optimizer 401 includes MVTs for a given MV that results in a constraint violation (e.g., of a CV, MV, or AV), the routine 116 may adjust the value for the given MV so that the constraint is no longer violated (this may occur when the DMMC block 38 calculates an unconstrained solution). On the other hand, when the optimizer 401 calculates a constrained solution, typically none of the MVTs in the first move plan (or any subsequent move plans for that matter) will result in a constraint violation. Thus, the values in a move plan implemented by the routine 116 and controller 11 often match the MVTs for the first move plan developed by the optimizer 401.

The objective function 403 may be selected from a plurality of potential pre-stored objective functions, each of which may mathematically represent a different manner of defining optimal operation of the process 104. For example, one of the pre-stored objective functions may be configured to maximize the profit of the plant, another one of the objective functions may be configured to minimize the use of a particular raw material that is in short supply while a still further one of the objective functions may be configured to maximize the quality of the product being manufactured within the process 104. Generally speaking, the utilized objective function uses a cost or profit associated with each move of a control, auxiliary and manipulated variable to determine the most optimal process operating point within the set of acceptable points as defined by the set point values or ranges of the control variables CV and the limits of the auxiliary and manipulated variables AV and MV. Of course, any desired objective function can be used instead or in addition to those described herein including objective functions which optimize each of a number of concerns, such as use of a raw material, profitability, etc. to some degree.

To select an objective function, a user or operator may provide an indication of the objective function 403 to be used by selecting the objective function 403 on an operator or user terminal. Of course, the user or operator can change the objective function being used during operation of the process. If desired, a default objective function may be used in cases in which the user does not provide or select an objective function.

Returning to the optimizer 401, in addition to the objective function 403, the optimizer 401 may receive, as inputs, a set of control variable set points (which are often operator specified set points for the control variables CV of the process 104, and may be changed by the operator or other user) and a range and weight or priority associated with each of the control variables CV. The optimizer 401 may additionally or alternatively receive a set of ranges or constraint limits and a set of weights or priorities for the auxiliary variables AV or a set of limits for the manipulated variables MV being used to control the process 104. The optimizer 401 may account for these constraints when developing a constrained solution, but may ignore them when developing an unconstrained solution.

Generally speaking, the ranges for the auxiliary and manipulated variables define the limits (typically based on physical properties of the plant) for the auxiliary and manipulated variables while the ranges for the control variables provide a range in which the control variables may operate for satisfactory control of the process. The weights for the control and auxiliary variables specify the relative importance of the control variables and the auxiliary variables with respect to one another during the optimization process and may be used, in some circumstances, to enable the optimizer 401 to generate a semi-constrained solution if attempting to develop a constrained solution when it is impossible to avoid violating all constraints.

Using any known or standard LP algorithm or technique, the optimizer 401 iterates to determine the set of target manipulated variables MVT (as determined from the steady state gain matrix) for each of a series of move plans (e.g., for the entire control horizon) which maximize or minimize the selected objective function 403. While developing a constrained solution, the optimizer 401 may maximize or minimize the objective function 403 while maintaining process operation that meets or falls within the control variable CV set point range limits, the auxiliary variable AV constraint limits, and the manipulated variable MV limits. When developing an unconstrained solution, the optimizer 401 may ignore these constraints and limits to develop a theoretical (and potentially unfeasible) solution.

In example operation, the optimizer 401 determines the most recent change in the manipulated variable values (i.e., determines the current values for the MVs) and, uses the predicted steady state control variables (CVs), auxiliary variables (AVs), and manipulated variables (MVs) to determine the changes in the process operation from its current operation through the control horizon (i.e., to determine the MV move plans for the next number of plans specified by the control horizon value); that is, to determine the dynamic operation of the routine 116 during the process of reaching the target or optimal process operating point.

When developing a constrained solution, generally speaking, the optimizer 401 will calculate target manipulated variable values (MVTs) by forcing each of the controlled variables and the auxiliary variables to their limits. As noted above, in many cases, a solution will exist in which each of the CVs are at their set point (which may initially be treated as an upper limit on the control variable) while each of the auxiliary variables remain within their respective constraint limits. If this is the case, then the optimizer 401 need only output the determined manipulated variable targets MVT that produce this optimal result for the objective function.

In some cases, however, due to tight constraints on some or all of the auxiliary or manipulated variables, it may be impossible to find a solution (e.g., represented by a series of MVT move plans, each having corresponding CVTs and AVTs) at which all of the process variables are within their respective constraint limits at every operating point for each scan because such a solution does not exist. In these cases, the optimizer 401 may calculate a semi-constrained solution. For example, as noted above, the optimizer 401 may allow the CVs to relax within their specified set point ranges in an attempt to find an operating point in which the auxiliary variables operate within their respective limits. If no solution exists in this case, then the optimizer may drop one of the auxiliary variable constraint limits as a limit within the solution and, instead, determine the optimal process operating point ignoring the dropped auxiliary variable constraint limits. Here, the optimizer 401 chooses which auxiliary or control variable to drop as a constraint limit based on the respective weights provided for each of the control and auxiliary variables (with, for example, the lowest weight or highest priority being dropped first). The optimizer 401 continues to drop auxiliary or control variables based on their provided weights or priorities until it finds an MV solution in which all of the set point ranges for the control variables and the limits for the remaining, higher priority auxiliary variables are met.

In any event, the optimizer 401 may feed the DMMC block 38 a set of optimal targets or setpoints or SPs (e.g., CVSS and AVSS), calculated based on solving the objective function 403, to be reached by the end of a prediction or control horizon. The DMMC block 38 may rely on the model 105/110 to calculate target CVs and AVs (i.e., CVTs and AVTs) needed at each step to reach the SPs, as well as target MVs (MVTs) needed to achieve the CVTs and AVTs. In other words, the optimizer 401 utilizes the model(s) 105/110 to calculate target trajectories for the CVs, AVs, and MVs to reach an optimal steady state operating point.

The DMMC block 38 uses the SPs to create the set of M manipulated variable signals (MVs) in the form of control signals (e.g., controller outputs) and delivers the MV signals to the process inputs (e.g., valve actuators) of the process 104. The MV signals are control signals which may be controller outputs or process inputs related to controlling the operation of valve actuators, burners, pumps, etc., or any other device that effects the physical operation of the process 104.

Note, because the DMMC block 38 operates as described above during each controller scan (i.e., because a complete solution and series of move plans may be calculated at each scan), the target values of the manipulated variables may change from scan to scan even if the SPs remain the same, and, as a result, the DMMC block 38 may never actually reach any particular one of these sets of target MVs tentatively scheduled for future scans, especially in the presence of noise, unexpected disturbances, changes in the process 104, etc.

As is typical, the DMMC block 38 includes a control variable prediction process model 105 (also called a "controller model" or a "prediction process model"), which may be any type of model used in any of the various different MPC control techniques. For example, the model 105 may be an N by M+D step response matrix (where N is the number of CVs plus the number of AVs; M is the number of MVs; and D is the number of DVs). The model 105 may be a first order, a second order, a third order, etc., predictive or first principles model, a state-space model, a convolution process model, or any other type of process model. The controller model 105 may be determined from process upset tests using time series analysis techniques that do not require a significant fundamental modeling effort, or may be determined using any other known process modeling techniques, including those which superimpose one or more sets of linear models or non-linear models.

In any event, the model 105 accounts for model mismatch by producing an output 107 defining a previously calculated prediction for each of the control and auxiliary variables CV and AV. A summer 108 subtracts these predicted values for the current time from the actual measured values of the control and auxiliary variables CV and AV at the current time, as sensed or measured within the process 104, to produce an error or correction vector (also known as a set of residuals). The set of residuals, typically referred to as the prediction error, defines a bias or offset error of the model 105 and is used to correct the predictions of the model 105.

During operation, the process model 105 uses the MV and DV inputs and the residuals to predict a future control parameter for each of the CVs and/or AVs over the control horizon and provides the future predicted values of the CVs and potentially the AVs (in vector form) on the line 109. The optimizer 401 may rely on these predictions when evaluating potential values for MVs at each move plan.

Further, the process model 105 and/or optimizer 401 may produce the predicted steady state values CVSS and AVSS discussed above. Thus, the block 105 may make predictions of the values for each of the CVs and AVs at each scan (e.g., based on each move plan) over the time to the prediction horizon.

Moreover, a control target block 110 determines a control target vector or set point vector for each of the N target control and auxiliary variables CVT and AVT provided thereto by, for example, a user or other optimization application. The control target block 110 may include a trajectory filter that defines the manner in which control and auxiliary variables are to be driven to their target values over time. The control target block 110 uses this filter and the target variables CVT and AVT as defined by the set points SP to produce a dynamic control target vector for each of the control and auxiliary variables defining the changes in the target variables CVT and AVT over a time period defined by the control horizon time.

A vector summer 114 then subtracts the future control parameter vector for each of the simulated or predicted control and auxiliary variables CV and AV on the line 109 from the dynamic control vectors produced by the block 110 to define a future error vector for each of the control and auxiliary variables CV and AV. The future error vector for each of the control and auxiliary variables CV and AV is then provided to the control algorithm 116, which operates (in coordination with the optimizer 401) to select the manipulated variable MV steps that minimize or maximize the objective function 403 (e.g., minimizing the integrated squared error (ISE) or integrated absolute error (IAE)) over the control horizon.

In some embodiments, the algorithm 116 may use an N by M control matrix developed from relationships between the N control and auxiliary variables input to the DMMC block 38 and the M manipulated variables output by the DMMC block 38 if desired. More particularly, the MPC control algorithm 116 may have two main objectives. First, the control algorithm 116 may try to minimize CV control error with minimal MV moves (e.g., within operational constraints when developing a constrained solution). Second, the control algorithm 401 may try to achieve optimal steady state MV values (MVSS) and target CV values calculated from the optimal steady state MV values.

The state equations for a typical model predictive controller may be expressed as:

$$\hat{x}_{k+1} = Ax_k + Bu_k \quad k = 0, 1, 2, \ldots \quad (1)$$

$$\hat{y}_k = C\hat{x}_k \quad (2)$$

$$\min_{u^N} \sum_{j=0}^{\infty} (y_{k+j}^T Q y_{k+j} + u_{k+j}^T R u_{k+j} + \Delta u_{k+j}^T S \Delta u_{k+j}) \quad (3)$$

where Q, R, S are the penalty weights for error, controller move and incremental move, respectively, xk is the model state matrix, yk is the process output and uk is the controller output. The DMMC block 38 and controller 38 may implement this state equation. Because the Q, R and S penalty vectors are inherently separate, MPC controllers generally do not have a performance tradeoff between set point tracking and disturbance rejection (unlike traditional controllers such as PID controllers). However, MPC controllers still need to be tuned for a specific multivariable process control objective. While the process model is typically matched with the internal structure of an MPC controller (e.g., process state space with the state space MPC formulation), additional tuning parameters determine the behavior with respect to set point change and disturbance rejection.

In any event, the operation of the DMMC block 38 in FIG. 4 assumes that a new process variable measurement is available during each controller scan or execution operation of the model 105 which produces a new set of controlled variable predictions over the time horizon. Operation of this controller, when new process variable measurements for the controlled process variables (CVs) are not available at each new controller scan, results in a controller that uses stale process variable data to perform control.

IV. Example Method 500 for Implementing Dual-Mode Model-Based Control

Figure 5:
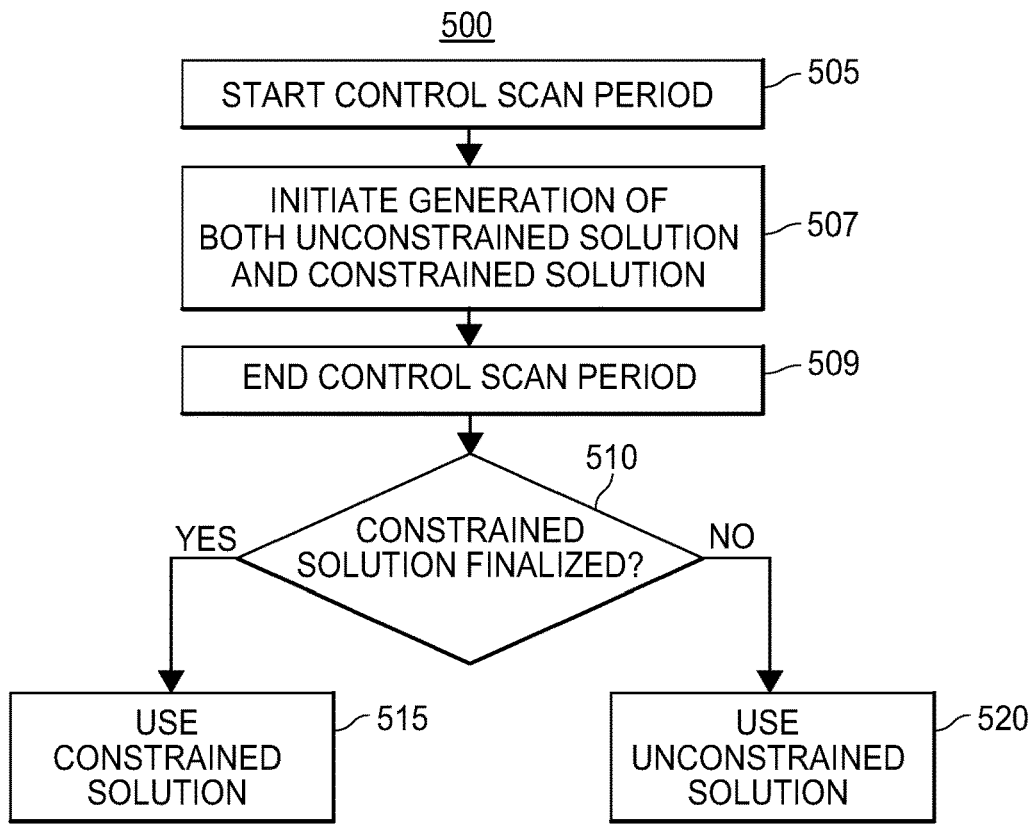
FIG. 5 illustrates an example method for implementing dual-mode model-based control.

FIG. 5 illustrates an example method 500 for implementing dual-mode model-based control according to an embodiment. The method 500 may be implemented, in whole or in part, by the system 10 shown in FIG. 1 and, more particularly, the controller 11 and DMMC block 38 shown in FIGS. 1 and 4. The method 500 may be saved to a memory as one or more instructions or routines (e.g., at the controller 11 and/or workstation 13).

The method 500 begins when a controller scan period begins (block 505). At the beginning of the scan period, the controller 11 receives a current set of measured values for a set of CVs controlled by the controller 11.

The controller 11 then initiates generation of both a constrained solution and an unconstrained solution to an optimization problem or objective function 403 (block 507).

At a block 509, the control scan period ends (or a decision threshold slightly preceding the end of the scan period arrives).

At a block 510, the controller 11 determines whether or not the constrained solution has finished developing. If it has, the controller 11 implements the constrained solution (block 515). If the constrained solution has not finished, the controller 11 implements the unconstrained solution (block 520). If the unconstrained solution also has not been developed for some reason, the controller 11 may utilize a pre-generated move plan (e.g., calculated from a pre-generated controller matrix).

V. Example Method 600 for Generating an Unconstrained Solution

Figure 6:
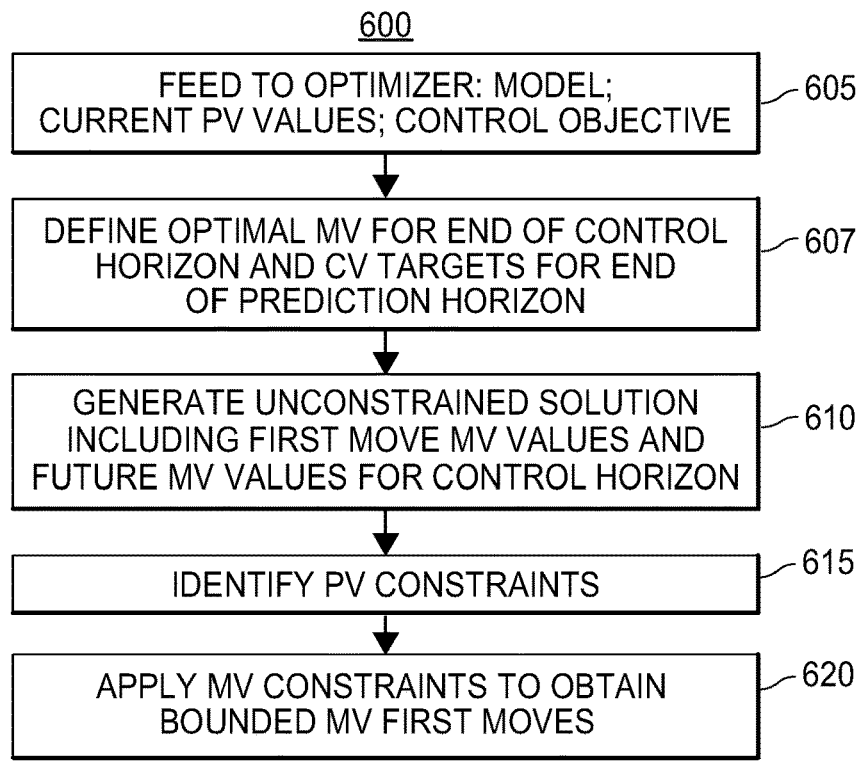
FIG. 6 illustrates an example method for implementing an unconstrained solution.

FIG. 6 illustrates an example method 600 for implementing an unconstrained solution according to an embodiment. The method 600 may be implemented, in whole or in part, by the system 10 shown in FIG. 1 and, more particularly, the controller 11 and DMMC block 38 shown in FIGS. 1 and 4. The method 600 may be saved to a memory as one or more instructions or routines (e.g., at the controller 11 and/or workstation 13).

At a block 605, the controller 11 feeds a process model, current PV values such as MV values (e.g., received at the beginning of the controller scan), predicted PV values and a control objective (e.g., the objective function 403) to the optimizer 401 to begin the process of generating a solution to the control objective. In some instances, tuning parameters and/or an error vector (e.g., representing prediction error) may also be fed to the optimizer.

At a block 607, the optimizer 401 may define one or more optimal MV values for the end of the control horizon, as well as CV targets for the end of the prediction horizon.

At a block 610, the optimizer 401 and/or controller 11 generates an unconstrained solution to the objective function 403. For example, depending on the exact nature of the objective function 403, the optimizer 401 generates a solution that minimizes or maximizes the objective function 403. Specifically, the optimizer 401 generates an optimal steady state plant operating point (e.g., represented by a set of steady state process variable targets) by the end of the control or prediction horizon, as well as a set of PVs (e.g., CVs, AVs, and/or MVs) for each of a series of scans leading to the final scan evaluated according to the prediction horizon. For each of the series of scans, the set of MV targets constitutes a move plan for that particular scan. Generally speaking, and as noted elsewhere, the optimizer 401 generates a constrained solution when feasible. When not feasible, slack variables may be used. These may make some constraint violations acceptable for the purpose of generating a solution. In general, it may be assumed that the optimizer 401 provides a constrained solution (e.g., when possible/feasible). The controller may use a steady state solution constrained at the end of prediction horizon, and the optimizer may develop a solution which will be dynamically constraint (e.g., through the whole prediction horizon).

At a block 615, the controller 11 identifies PV constraints (e.g., constraints for CVs, AVs, or MVs).

At a block 620, the controller 11 then evaluates the first move plan from the series of move plans included in the unconstrained solution. If any of the MV values in the first move plan violates an MV constraints, or if the process model predicts that a CV or AV constraint will be violated in response to one of the MV moves, one or more of the MVs are adjusted until the first move plan no longer violates a constraint. When the first move plan no longer violates a constraint, it is consider "bounded" (i.e., bounded by all relevant constraints).

Note, in this example, constraint violations predicted to occur after the first move plan are largely ignored by the controller 11 and optimizer 401. Accordingly, it is possible that an "ideal" solution not accounting for constraints can result in less than ideal trajectories for PV values when constraints are taken into account (because the predictions assume moves that the controller 11 will not make in practice). Said another way, the value gained by the ability to predict future PV values is somewhat blunted because, in this particular scenario, the controller 11 may not be accurately predicting future PV values in light of the fact that constraints will be accounted for by the controller 11 (e.g., by modifying values in the first move plan) at every scan period when the controller 11 is outputting MV signals.

If the controller 11 is utilizing the unconstrained solution (e.g., because a constrained solution was not developed within the scan period), the values within the bounded first move plan are transmitted via one or more controller outputs of the controller 11 to field devices to implement control of the process.

VI. Example Method 700 for Generating a Constrained Solution

Figure 7:
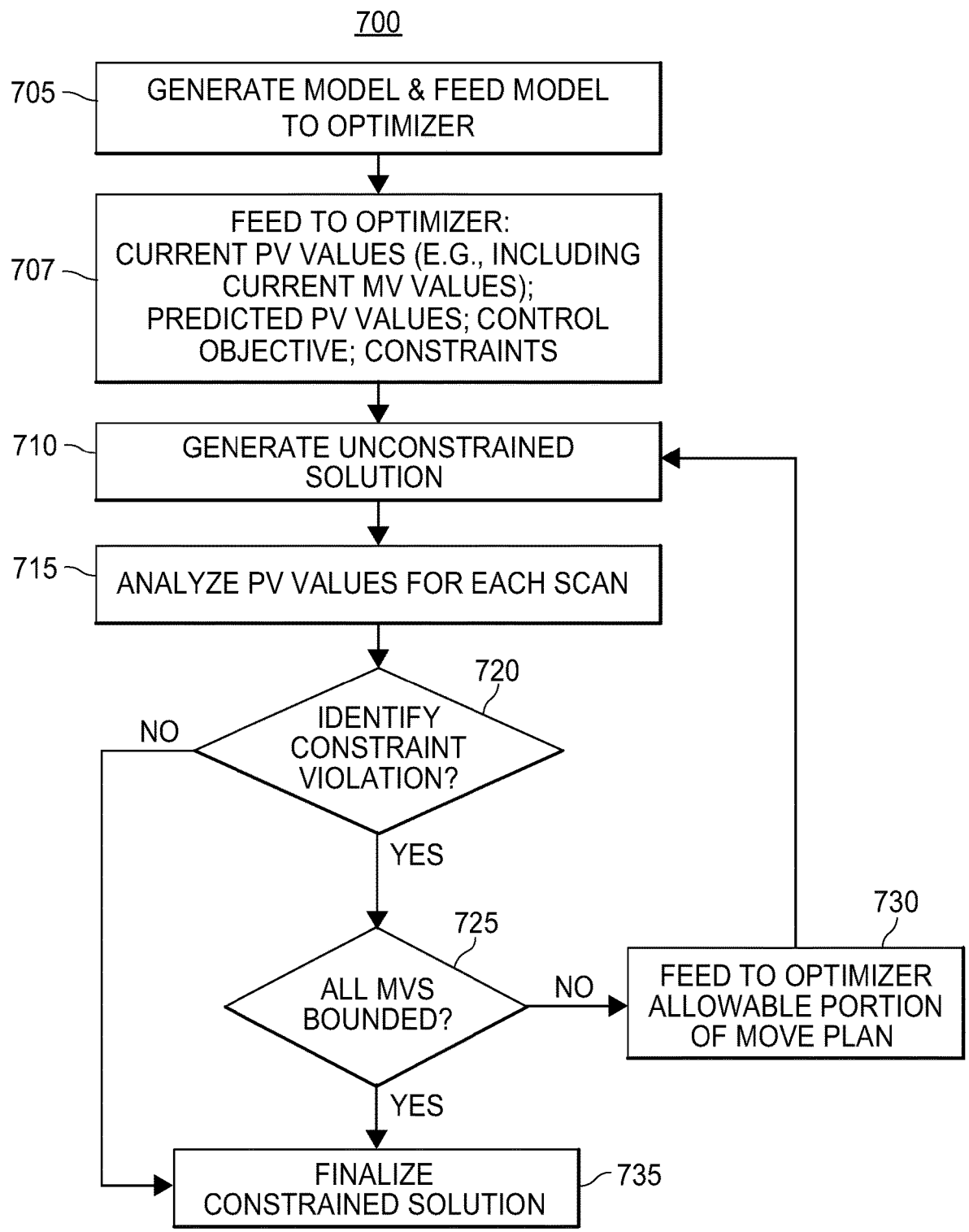
FIG. 7 illustrates an example method for implementing an constrained solution.

FIG. 7 illustrates an example method 700 for implementing an constrained solution according to an embodiment. The method 700 may be implemented, in whole or in part, by the system 10 shown in FIG. 1 and, more particularly, the controller 11 and DMMC block 38 shown in FIGS. 1 and 4. The method 700 may be saved to a memory as one or more instructions or routines (e.g., at the controller 11 and/or workstation 13).

At a block 705, the controller 11 generates a new process model (e.g., while the process is offline). Typically, model generation occurs by capturing the dynamic relationships between the inputs and outputs of the process being controlled, and generating a mathematical model that reflects those dynamic relationships. Traditionally, these dynamic relationships are captured during a model generation procedure that involves (i) introducing known disturbances or upsets into the process by changing one or more manipulated variables, and (ii) observing how the process reacts to the changes to the manipulated variables. When the process finishes responding to the changes to the manipulated variables and reaches a steady state, the controller 11 can generate a process model based on the relationship between the changes to the manipulated variables and the observed process response. The controller 11 may then resume normal control utilizing the new (and likely more accurate) process model. In some instances, the controller 11 does not generate a new model when implementing the method 700. After generating the model, the model may be fed to the optimizer 401.

At a block 707, the controller 11 feeds, current PV values (e.g., received at the beginning of the controller scan), predicted PV values, a control objective (e.g., the objective function 403), and constraints for one or more PVs (e.g., CVs, MVs, and/or AVs) to the optimizer 401 to begin the process of generating a solution to the control objective. In some instances, tuning parameters and/or an error vector (e.g., representing prediction error) may also be fed to the optimizer 401.

At a block 710, the controller 11 generates an unconstrained solution including a set of PVs for a series of scans extending to a prediction horizon (e.g., by implementing the steps of method 600). Each set of PVs may include a set of MVs constituting a "move plan" to be implemented (at least in theory) by the controller for that particular scan. As explained in more detail below, the method 700 may utilize the unconstrained solution as a "candidate solution" to be evaluated for constraint violations and to then be modified to create successive candidate solutions until a candidate solution is eventually identified that does not violate any constraints.

At a block 715, the controller 11 analyzes the set of PVs developed for each future scan (including the move plan for each scan).

At a block 720, the controller 11 identifies the first move plan to result in a constraint violation. As an example, the third scheduled move plan may include an MV value that exceeds an MV constraint or that results in another PV exceeding a constraint (e.g., an MV value of 78% for a control valve CV821 exceeds an upper constraint for CV821 of 75% open). If no constraint violation exists, the controller 11 proceeds to the block 735 (this may occur, particularly relatively early in the process, if the constraints are especially few or lenient). Generally speaking, a constraint violation exists if any one of a set of constraints associated with the DMMC block 38 violated.

At a block 725, the controller 11 determines if all MVs have been constrained or bounded. Generally speaking, this is only true if the controller 11 has iteratively analyzed updated solutions as constraint violations are identified until a point at which no MV value in any of the series of MV plans violates a constraint. If all MVs have been constrained or bounded, the controller proceeds to block 735 (described in more detail below). If one or more MVs remain unconstrained across the series of move plans, the controller 11 proceeds to block 730.

At the block 730, the controller 11 feeds the optimizer 401 the allowable portion of the move before the constraint violation occurred. Sticking with the previous example, the first two move plans would be fed to the optimizer 401 along with other previously mentioned components.

After block 730, the controller then proceeds to the block 710, where the optimizer 401 generates a modified solution (this modified solution may be thought of as a new candidate solution) that assumes the first two move plans and that, for the subsequent move plans after the assumed move plans, does not allow the MV to violate the previously identified constraint. For example, sticking with the previous example, the optimizer 401 may generate a solution in which the value for the control valve CV821 never exceeds the upper constraint of 75% for any of the move plans within the series of move plans.

The controller 11 then again implements blocks 715 and 720 (and potentially 725 and 730) with the modified solution. This iterative process may continue until a modified solution or candidate solution is generated in which none of the series of move plans violates any of the constraints.

At a block 735, after a modified unconstrained solution is found to include no constraint violations or after a constraint violation has been found that results in all MVs being bound through an entire series of move plans, the controller 11 finalizes the constrained solution. If the original unconstrained solution does not violate any constraints, it may be utilized as the constrained solution. In some instances, the original unconstrained violation may need only slight modification before a constrained solution is determined.

After the constrained solution has been finalized, the controller 11 may utilize the first move plan of the constrained solution (assuming sufficient time is left in the scan period) by generating controller outputs to carry the values of the first move plan (e.g., to control field devices in accordance with the MV values of the first move plan). Because the entire series of move plans should result in no constraint violations, no need should exist to modify any of the MV values of the first move plan.

The method 700 may be thought of as a method to iteratively bound MV values included the move plans of a solution. That is, each time a constraint violation is identified at the step 720, the next candidate solution assumes the allowable move plans of the solution and the allowable range for each MV that has previously been analyzed, across the series of move plans, for a constraint violation. In an embodiment, each successive candidate solution should have one fewer unbound MV for which a constraint violation may be identified.

VII. Additional Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the methods 500-700 specifically, the described functions may be implemented, in whole or in part, by the devices, circuits, or routines of the system 10 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present invention has been described with reference to specific examples, which are intended to be illustrative only and not to be limiting of the invention, it will be apparent to those of ordinary skill in the art that changes, certain additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

VIII. General Terms and Phrases

Throughout this specification, some of the following terms and phrases are used.

Communication Link. Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connections for transmission of light and (ii) wireless links such as wireless electromagnetic signals that carry information via changes made to one or more properties of electromagnetic waves.

As noted, a wireless link may be a wireless electromagnetic signal that carries information via changes made to one or more properties of an electromagnetic wave(s). A wireless electromagnetic signal may be a microwave or radio wave and may be referred to as a radio frequency or "RF" signal. Unless otherwise stated, described RF signals may oscillated at a frequency within any one or more bands found in the spectrum of roughly 30 kHz to 3,000 GHz (e.g., an 802.11 signal in the 2.4 GHz band). Example RF bands include the low frequency ("LF") band at 30-300 kHz, the medium frequency ("MF") band at 300-3,000 kHz, the high frequency ("HF") band at 3-30 MHz, the very high frequency ("VHF") band at 30-300 MHz, the ultra-high frequency ("UHF") band at 300-3,000 MHz, the super high frequency ("SHF") band at 3-30 GHz, the extremely high frequency ("SHF") band at 30-300 GHz, and the tremendously high frequency ("THF") band at 300-3,000 GHz.

In some instances, a wireless electromagnetic signal may be a light signal oscillating at a frequency of roughly 300 GHz to 30 PHz with wavelengths of roughly 100 nm to 1 mm, which may be: (i) an ultraviolet light ("UV") signal having a wavelength roughly in the range of 10 nm-400 nm and a frequency roughly in the range of 750 THz-30 PHz; (ii) a visible light signal having a wavelength roughly in the range of 400 nm-700 nm and a frequency roughly in the range of 430 THz-750 THz, or (iii) an infrared ("IR") signal having a wavelength roughly in the range of 700 nm-1 mm and a frequency roughly in the range of 300 GHz-430 THz. Unless otherwise stated, described light signals may conform to any suitable light signal protocol or standard, such as visible light communication (VLC) standards, light fidelity (Li-Fi) standards, Infrared Data Association (IrDA) standards, IrSimple standards, etc.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media. Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network. As used herein and unless otherwise specified, when used in the context of system(s) or device(s) that communicate information or data, the term "network" refers to a collection of nodes (e.g., devices or systems capable of sending, receiving or forwarding information) and links which are connected to enable telecommunication between the nodes.

Depending on the embodiment (and unless otherwise stated), each of the described networks may include dedicated routers, switches, or hubs responsible for forwarding directing traffic between nodes, and, optionally, dedicated devices responsible for configuring and managing the network. Some or all of the nodes in the described networks may be also adapted to function as routers in order to direct traffic sent between other network devices. Nodes of the described networks may be inter-connected in a wired or wireless manner, and may have different routing and transfer capabilities.

For example, dedicated routers may be capable of high-volume transmissions while some nodes may be capable of sending and receiving relatively little traffic over the same period of time. Additionally, the connections between nodes on the described network may have different throughput capabilities and different attenuation characteristics. A fiberoptic cable, for example, may be capable of providing a bandwidth several orders of magnitude higher than a wireless link because of the difference in the inherent physical limitations of the medium. If desired, each described network may include networks or sub-networks, such as a personal area network (PAN), a local area network (LAN), or a wide area network (WAN).

Processor. The various operations of example methods described herein may be performed, at least partially, by one or more described or implicitly disclosed controllers or processors (e.g., the controller 11 may include a processor). Generally speaking, the terms "processor" and "microprocessor" are used interchangeably, each referring to a computer processor configured to fetch and execute instructions stored to memory.

By executing these instructions, the disclosed processor(s) can carry out various operations or functions defined by the instructions. The disclosed processor(s) may be temporarily configured (e.g., by instructions or software) or permanently configured to perform the relevant operations or functions (e.g., a processor for an Application Specific Integrated Circuit, or ASIC), depending on the particular embodiment. Each disclosed processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. For example, when a single processor is described as performing a set of operations, it is understood that multiple processors may perform the set of operations in some embodiments according to any desired distribution across the multiple processors. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Routine. Unless otherwise noted, a "routine," "module," or "application" described in this disclosure refers to a set of computer-readable instructions that may be stored on a CRM. Generally, a CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

Further, unless otherwise stated, each routine or application may be embodied as: (i) a stand-alone software program, (ii) a module or sub-module of a software program, (iii) a routine or sub-routine of a software program, or (iv) a resource invoked or accessed by a software program via a "call" to thereby cause the system to implement the task or function associated with the resource. The call may be (i) a "function call" that is invoked to cause execution of a resource (e.g., set of instructions) stored at a library accessible by the software program; (ii) a "system call" that is invoked to cause execution of a system resource (e.g., often running in privileged kernel space and only executable only by the operating system); (iii) a "remote call" that is invoked to cause a logical or physical entity with a different address space to execute a resource; or (iv) some combination thereof. As an example, a routine executed by a processor of a device may invoke a "remote call" to cause execution of a resource at (i) a second device (e.g., a server host, an end-user device, a networking device, a peripheral device in communication with the device, or some other physical device); (ii) a virtual-machine on the same or different device; (iii) a processor (e.g., CPU or GPU) that is different from the original processor and that may be internal or external to the device executing the routine; or (iv) some combination thereof.

Each routine may be represented by code implemented in any desired language, such as source code (e.g., interpretable for execution or compilable into a lower level code), object code, bytecode, machine code, microcode, or the like. The code may be written in any suitable programming or scripting language (e.g., C, C++, Java, Actionscript, Objective-C, Javascript, CSS, Python, XML, Swift, Ruby, Elixir, Rust, Scala, or others).

What is claimed is:

1. A method comprising:
   (A) implementing model-based control, via a process controller coupled to one or more field devices, of a process represented by a set of process variables (PVs) including (i) a set of manipulated variables (MVs) adjustable by the process controller via the one or more field devices, and (ii) a set of controlled variables (CVs), each of which is dependent on one or more MVs in the set of MVs;
   (B) initiating a scan, at a beginning of a scan period, by the process controller to obtain a current set of measured values of the set of CVs;
   (C) prior to the scan period ending, implementing a dual-mode of operation that includes selecting a current move plan to be implemented by the process controller for the set of MVs in accordance with a process model and a set of constraints for the PVs, including:
      (i) initiating generation, using the current set of measured values of the set of CVs as model inputs for the process model, of both: (a) an unconstrained solution including a series of unbounded move plans that are unbound by the set of constraints, and (b) a constrained solution including a series of bounded move plans that avoid violating any of the set of constraints;
      (ii) when the constrained solution is generated before the end of the scan period: selecting, as the current move plan, a first move plan from the series of bounded move plans of the constrained solution; and
      (iii) when the constrained solution is not generated before the end of the scan period: selecting, as the current move plan, a first move plan from the series of unbounded move plans of the unconstrained solution; and
   (D) implementing control of the process before the end of the scan period by setting the set of MVs to a set of values included in the current move plan by: transmitting a set of controller outputs, carrying the set of values, to the field devices to cause the field devices to drive the set of MVs to the set of values.

2. The method of claim 1, wherein selecting, as the current move plan, the first move plan from the series of unbounded move plans of the unconstrained solution comprises: modifying the first move plan when any values of the set of values included in the first move plan violate a constraint of the set of constraints, so that the first move plan no longer results in the violation of the constraint.

3. The method of claim 1, wherein the scan period is a first scan period, wherein the method further comprises:
   after the end of the first scan period, initiating a next scan at the beginning of a second scan period to obtain a next set of measured values as second current set of measured values of the set of CVs and to again implement the dual-mode of operation to select a second current move plan for the next scan, including:
      (i) initiating generation, using the second current set of measured values of the set of CVs as the model inputs for the process model, of both: (a) a second unconstrained solution including a second series of unbounded move plans that are unbound by the set of constraints, and (b) a second constrained solution including a second series of bounded move plans that avoid violating any of the set of constraints;
      (ii) when the second constrained solution is generated before the end of the second scan period: selecting, as the second current move plan, a first move plan from the second series of bounded move plans of the second constrained solution; and
      (iii) when the second constrained solution is not generated before the end of the second scan period: selecting, as the second current move plan, a first move plan from the second series of unbounded move plans of the second unconstrained solution.

4. The method of claim 1, wherein the scan period is a regular scan period that is a same length at every scan.

5. The method of claim 1, wherein the scan period is configured to vary depending on the scan.

6. The method of claim 1, wherein the one or more field devices include a control valve actuator and wherein at least one of the MVs is a variable representing a valve positon.

7. The method of claim 1, wherein initiating the generation of the constrained solution comprises: starting with the unconstrained solution and iteratively modifying the unconstrained solution to eliminate values that result in a violation of a constraint of the set of constraints.

8. The method of claim 1, wherein initiating the generation of the constrained solution comprises: starting with a pre-generated series of move plans and iteratively modifying the pre-generated move plans to eliminate values that result in a violation of a constraint of the set of constraints.

9. A system comprising:
one or more field devices for monitoring or controlling a process; and
a process controller communicatively coupled to the one or more field devices and configured to control the process, wherein the process is represented by a set of process variables (PVs) including (i) a set of manipulated variables (MVs) adjustable by the process controller via the one or more field devices, and (ii) a set of controlled variables (CVs), each of which is dependent on one or more MVs in the set of MVs;
wherein the process controller is configured to implement a dual-mode model control operation to select a current move plan to be implemented by the process controller for the set of MVs in accordance with a process model and a set of constraints for the PVs, wherein the process controller is configured to:
(A) initiate a scan, at a beginning of a scan period, by the process controller to obtain a current set of measured values of the set of CVs;
(B) prior to the scan period ending:
(i) initiate generation, using the current set of measured values of the set of CVs as model inputs for the process model, of both: (a) an unconstrained solution including a series of unbounded move plans that are unbound by the set of constraints, and (b) a constrained solution including a series of bounded move plans that avoid violating any of the set of constraints;
(ii) when the constrained solution is generated before the end of the scan period: select, as the current move plan, a first move plan from the series of bounded move plans of the constrained solution; and
(iii) when the constrained solution is not generated before the end of the scan period: select, as the current move plan, a first move plan from the series of unbounded move plans of the unconstrained solution; and
(C) implement control of the process before the end of the scan period by setting the set of MVs to a set of values included in the current move plan by:
transmitting a set of controller outputs, carrying the set of values, to the field devices to cause the field devices to drive the set of MVs to the set of values.

10. The system of claim 9, wherein the process controller is configured to select, as the current move plan, the first move plan from the series of unbounded move plans of the unconstrained solution by: modifying the first move plan when any values of the set of values included in the first move plan violate a constraint of the set of constraints, so that the first move plan no longer results in the violation of the constraint.

11. The system of claim 9, wherein the scan period is a first scan period, wherein the process controller is further configured to:
after the end of the first scan period, initiate a next scan at the beginning of a second scan period to obtain a next set of measured values as second current set of measured values of the set of CVs and to again implement the dual-mode of operation to select a second current move plan for the next scan, including:
(i) initiate generation, using the second current set of measured values of the set of CVs as the model inputs for the process model, of both: (a) a second unconstrained solution including a second series of unbounded move plans that are unbound by the set of constraints, and (b) a second constrained solution including a second series of bounded move plans that avoid violating any of the set of constraints;
(ii) when the second constrained solution is generated before the end of the second scan period: select, as the second current move plan, a first move plan from the second series of bounded move plans of the second constrained solution; and
(iii) when the second constrained solution is not generated before the end of the second scan period: select, as the second current move plan, a first move plan from the second series of unbounded move plans of the second unconstrained solution.

12. The system of claim 9, wherein the scan period is a regular scan period that is a same length at every scan.

13. The system of claim 9, wherein the scan period is configured to vary depending on the scan.

14. The system of claim 9, wherein the one or more field devices include a control valve actuator and wherein at least one of the MVs is a variable representing a valve positon.

15. The system of claim 9, wherein initiating the generation of the constrained solution comprises: starting with the unconstrained solution and iteratively modifying the unconstrained solution to eliminate values that result in a violation of a constraint of the set of constraints.

16. The system of claim 9, wherein initiating the generation of the constrained solution comprises: starting with a pre-generated series of move plans and iteratively modifying the pre-generated move plans to eliminate values that result in a violation of a constraint of the set of constraints.

17. A method comprising:
(A) implementing a dual-mode model-based process controller configured to control one or more field devices in a process control environment;
(B) initiating a scan by the model-based controller to obtain a set of current values for a set of process variables (PVs), the set of current values representing a current state of the controlled process, the process variables including a plurality of controlled variables (CVs) and a plurality of manipulated variables (MVs);
(C) generating an unconstrained solution to an optimization problem utilizing a process model by generating, using the process model, a series of move plans for the plurality of MVs to achieve a predetermined objective regardless of whether or not any of the series of move plans violate any of a set of constraints for the PVs, such that values for each of the MVs in each of the series of move plans are unbound by the set of constraints;

(D) initiating generation of a constrained solution to the optimization problem utilizing the process model by:
   (i) storing the unconstrained solution as a candidate solution;
   (ii) bounding a first MV, from the plurality of MVs, by analyzing the candidate solution to: (a) identify a first-in-time violation of a constraint of the set of constraints and determine that the first MV resulted in the first-in-time violation; and (b) calculate an allowable range for the first MV based on one or more values for the first MV included in move plans of the series of move plans that were scheduled prior to the first-in-time violation;
   (iii) bounding remaining MVs, from the plurality of MVs, by generating, in an iterative manner, a modified candidate solution including a modified series of move plans for each of the remaining MVs such that each of the modified candidate solutions maintains previously bounded MVs of the MVs within the calculated allowable ranges and such that each successive modified candidate solution of the modified candidate solutions includes one less unbound MV of the MVs than a previous modified candidate solution of the modified candidate solutions, wherein the remaining MVs are bounded in an order based on which of the remaining MVs is first to violate a constraint of the set of constraints for each of the modified candidate solutions; and
   (iv) after each of the plurality of MVs has been bound such that a last modified candidate solution of the modified candidate solutions includes a final series of move plans that does not violate any of the set of constraints, finalizing the constrained solution by storing the last modified candidate solution as the constrained solution;
(E) when the scan period expires before the constrained solution is finalized: (i) modifying any values, in a first move plan of the series of move plans for the unconstrained solution, that violate any of the set of constraints to achieve a bounded first move plan of the series of move plans that does not violate any of the set of constraints, and (ii) utilizing the bounded first move plan of the unconstrained solution for a set of controller outputs to control the one or more field devices in accordance with the bounded first move plan; and
(F) when the constrained solution is finalized before the scan period expires, utilizing a first move plan of the series of move plans of the constrained solution for the set of controller outputs to control the one or more field devices in accordance with the bounded first move plan.

18. The method of claim 17, further comprising initiating a second scan by the model-based controller to obtain a second set of current values for the set of PVs; generating a second unconstrained solution to the optimization problem using the second set of current values for the set of PVs; initiating generation of a second constrained solution to the optimization problem using the second set of current values for the set of PVs; and utilizing the constrained solution to generate the set of control outputs when the constrained solution is finalized before the second scan period ends; and utilizing the unconstrained solution to generate the set of control outputs when the constrained solution is not finalized before the second scan period ends.

* * * * *

UNITED STATES PATENT AND TRADEMARK OFFICE
CERTIFICATE OF CORRECTION

Page 1 of 2

PATENT NO. : 11,467,545 B2
APPLICATION NO. : 16/804799
DATED : October 11, 2022
INVENTOR(S) : Wilhelm K. Wojsznis et al.

It is certified that error appears in the above-identified patent and that said Letters Patent is hereby corrected as shown below:

On the Title Page

At item (72), Line 1, "Oborniki (PL);" should be -- Oborniki Sl. (PL); --.

In the Drawings

At fig. 2, sheet 2 of 6, "AI= Analog Output" should be -- AO= Analog Output --.

In the Specification

At Column 6, Lines 61-62, "an constrained" should be -- a constrained --.

At Column 7, Line 17, "may" should be -- may be --.

At Column 9, Line 47, "a" should be -- to a --.

At Column 12, Line 22, "flow)" should be -- flow). --.

At Column 14, Line 10, "set target control and auxiliary variables (CVT) and (AVT)," should be -- set control and auxiliary variable target (CVT) and (AVT) values, --.

At Column 14, Line 34, "etc))." should be -- etc). --.

At Column 14, Lines 39-41, "control variable target values (CVTs), auxiliary variable target values (AVTs), and manipulated variable target values (MVTs)" should be -- control variable targets (CVTs) values, auxiliary variable targets (AVTs) values, and manipulated variable targets (MVTs) values --.

Signed and Sealed this
Sixteenth Day of December, 2025

John A. Squires
*Director of the United States Patent and Trademark Office*

CERTIFICATE OF CORRECTION (continued)
U.S. Pat. No. 11,467,545 B2

At Column 14, Line 45, "(CVSS) and steady state auxiliary variable (AVSS)," should be -- (SSCV) and steady state auxiliary variable (SSAV), --.

At Column 14, Line 66, "be a" should be -- is a --.

At Column 16, Lines 38-39, "target manipulated variable values (MVTs)" should be -- manipulated variable targets (MVTs) values --.

At Column 17, Line 9, "CVSS and AVSS)," should be -- SSCV and SSAV), --.

At Column 17, Line 14, "target MVs (MVTs)" should be -- MV targets (MVTs) --.

At Column 17, Line 19, "signals (MVs)" should be -- (MV) signals --.

At Column 18, Line 6, "CVSS and AVSS" should be -- SSCV and SSAV --.

At Column 18, Lines 46-47, "steady state MV values (MVSS)" should be -- steady state MV (SSMV) values --.

At Column 20, Line 28, "constraint" should be -- constrained --.

At Column 20, Line 39, "consider" should be -- considered --.

At Column 20, Line 66, "an constrained" should be -- a constrained --.

At Column 21, Line 62, "violated." should be -- is violated. --.

At Column 24, Line 56, "oscillated" should be -- oscillate --.

At Column 24, Line 66, "("SHF")" should be -- ("EHF") --.

At Column 26, Line 55, "certain of the" should be -- certain --.

In the Claims

At Column 29, Line 7, "positon." should be -- position. --.

At Column 30, Line 38, "positon." should be -- position. --.